United States Patent
Oppermann

(10) Patent No.: US 9,747,176 B2
(45) Date of Patent: Aug. 29, 2017

(54) DATA STORAGE WITH VIRTUAL APPLIANCES

(71) Applicant: MPSTOR LIMITED, Cork (IE)

(72) Inventor: William Oppermann, Cork (IE)

(73) Assignee: MPSTOR LIMITED, Cork (IE)

( * ) Notice: Subject to any disclaimer, the term of this patent is extended or adjusted under 35 U.S.C. 154(b) by 60 days.

(21) Appl. No.: 14/406,678

(22) PCT Filed: Jun. 26, 2013

(86) PCT No.: PCT/EP2013/063437
§ 371 (c)(1),
(2) Date: Dec. 9, 2014

(87) PCT Pub. No.: WO2014/009160
PCT Pub. Date: Jan. 16, 2014

(65) Prior Publication Data
US 2015/0186226 A1    Jul. 2, 2015

(30) Foreign Application Priority Data
Jun. 29, 2012 (IE) .................................. 2012/0300

(51) Int. Cl.
*G06F 11/00* (2006.01)
*G06F 11/14* (2006.01)
(Continued)

(52) U.S. Cl.
CPC .......... *G06F 11/1484* (2013.01); *G06F 3/067* (2013.01); *G06F 3/0617* (2013.01);
(Continued)

(58) Field of Classification Search
CPC ............. G06F 11/1484; G06F 9/45558; G06F 2201/815; G06F 11/203; G06F 9/45533;
(Continued)

(56) References Cited

U.S. PATENT DOCUMENTS

| 7,519,008 B2 * | 4/2009 | McDermott ........ H04L 41/0893 370/254 |
| 7,751,327 B2 * | 7/2010 | Karino .................... H04L 45/00 370/235 |

(Continued)

FOREIGN PATENT DOCUMENTS

| WO | 2010/030996 A1 | 3/2010 |
| WO | 2011/046813 A2 | 4/2011 |
| WO | 2011/049574 A1 | 4/2011 |

OTHER PUBLICATIONS

International Search Report; PCT/EP2013/063437; Sep. 5, 2013.

*Primary Examiner* — Loan L. T. Truong
(74) *Attorney, Agent, or Firm* — Studebaker & Brackett PC

(57) ABSTRACT

A data storage system has at least two universal nodes each having CPU resources, memory resources, network interface resources, and a storage virtualizer. A system controller communicates with all of the nodes. Each storage virtualizer in each universal node is allocated by the system controller a number of storage provider resources that it manages. The system controller maintains a map for dependency of virtual appliances to storage providers, and the storage virtualizer provides storage to its dependent virtual appliances either locally or through a network protocol (N_IOC, S_IOC) to another universal node. The storage virtualizer manages storage providers and is tolerant to fault conditions. The storage virtualizer can migrate from any one universal node to any other universal node.

14 Claims, 8 Drawing Sheets

(51) Int. Cl.
*G06F 3/06* (2006.01)
*G06F 11/20* (2006.01)

(52) U.S. Cl.
CPC .......... *G06F 3/0635* (2013.01); *G06F 3/0664* (2013.01); *G06F 11/1469* (2013.01); *G06F 11/203* (2013.01); *G06F 11/2035* (2013.01); *G06F 11/2046* (2013.01); *G06F 11/2058* (2013.01); *G06F 11/2069* (2013.01); *G06F 11/2087* (2013.01); *G06F 2201/815* (2013.01); *G06F 2201/84* (2013.01)

(58) Field of Classification Search
CPC .. G06F 11/0712; G06F 9/5088; G06F 9/5077; H04L 67/1002; H04L 67/1029; H04L 67/1034; H04L 41/0893; H04L 45/28
See application file for complete search history.

(56) References Cited

U.S. PATENT DOCUMENTS

| | | | | |
|---|---|---|---|---|
| 8,019,965 B2* | 9/2011 | Agombar | .............. | G06F 3/0605 711/112 |
| 8,230,256 B1* | 7/2012 | Raut | .................. | G06F 11/2028 714/13 |
| 8,307,116 B2* | 11/2012 | Keckler | .............. | G06F 15/7825 370/389 |
| 8,307,239 B1* | 11/2012 | Keith, Jr. | ............ | G06F 11/1456 714/2 |
| 8,549,516 B2* | 10/2013 | Warfield | ............. | G06F 9/45533 718/1 |
| 9,100,293 B2* | 8/2015 | Ziskind | ............... | G06F 11/1484 |
| 9,465,534 B2* | 10/2016 | Wang | ................ | H04M 1/72519 |
| 2002/0188590 A1* | 12/2002 | Curran | ................. | G06F 3/0622 |
| 2003/0140108 A1* | 7/2003 | Sampathkumar | ....... | H04L 29/06 709/208 |
| 2004/0078654 A1* | 4/2004 | Holland | ............ | G06F 17/30607 714/13 |
| 2004/0168170 A1* | 8/2004 | Miller | ................... | G06F 9/5077 718/104 |
| 2005/0108593 A1* | 5/2005 | Purushothaman | .. | G06F 11/2028 714/4.11 |
| 2005/0265004 A1* | 12/2005 | Coglitore | ............. | H05K 7/1488 361/724 |
| 2006/0155912 A1* | 7/2006 | Singh | ................... | G06F 9/5088 711/6 |
| 2006/0174087 A1* | 8/2006 | Hashimoto | ........... | G06F 9/5077 711/173 |
| 2008/0250266 A1* | 10/2008 | Desai | .................. | G06F 11/1482 714/4.12 |
| 2009/0183166 A1* | 7/2009 | Dillenberger | ......... | G06F 9/5077 718/104 |
| 2010/0037089 A1* | 2/2010 | Krishnan | ............ | G06F 11/1484 714/5.11 |
| 2010/0122124 A1* | 5/2010 | Chen | .................... | G06F 9/45558 714/57 |
| 2010/0228903 A1* | 9/2010 | Chandrasekaran | . | G06F 9/45558 711/6 |
| 2011/0032944 A1* | 2/2011 | Elzur | .................... | H04L 49/602 370/395.53 |
| 2011/0196842 A1 | 8/2011 | Timashev et al. | | |
| 2011/0231696 A1* | 9/2011 | Ji | ........................ | G06F 11/1438 714/3 |
| 2011/0252271 A1* | 10/2011 | Frenkel | ............... | G06F 11/0712 714/4.1 |
| 2012/0110154 A1* | 5/2012 | Adlung | ................ | G06F 9/5077 709/223 |
| 2012/0297236 A1* | 11/2012 | Ziskind | ............... | G06F 11/1484 714/3 |
| 2013/0036323 A1* | 2/2013 | Goose | ................. | G06F 11/1484 714/4.11 |
| 2013/0282887 A1* | 10/2013 | Terayama | ........... | G06F 9/45533 709/223 |
| 2013/0326546 A1* | 12/2013 | Bavishi | ................ | G06F 17/303 719/328 |
| 2014/0006731 A1* | 1/2014 | Uluski | .................. | G06F 3/0604 711/155 |

* cited by examiner

DATA STORAGE WITH VIRTUAL APPLIANCES

INTRODUCTION

Field of the Invention

The invention relates to data storage and more particularly to organisation of functional nodes in providing storage to consumers.

Virtual Appliances (VA), also known as Virtual Machines, are created through the use of a Hypervisor application, Hypervisor, network, and compute and storage resources. They are described for example in US2010/0228903 (Chandrasekaran). Resources for the virtual appliances are provided by software and hardware for network, compute and storage functions. The generally accepted definition of a VA is an aggregation of a guest operating system, using virtualised compute, memory, network and storage resources within a Hypervisor environment.

Network resources include networks, virtual LANs (VLANs), tunneled connections, private and public IP addresses and any other networking structure required to move data from the appliance to the user of the appliance.

Compute resources include memory and processor ressources required to run the appliance guest operation system and its application program.

Storage resources consist of storage media mapped to each virtual appliance through an access protocol. The access protocol could be a block storage protocol such as SAS, Fibre Channel, iSCSI or a file access protocol for example CIFS, NFS, and AFT.

At present, the cloud may be used to virtualise these resources, in which a Hypervisor Application manages user dashboard requests and creates, launches and manages the VA (virtual appliance) and the resources that the appliance requires.

This framework can be best understood as a general purpose cloud but is not limited to a cloud. Example implementations are OpenStack™, EMC Vsphere™, and Citrix Cloudstack™.

In many current implementations compute, storage and network nodes are arranged in a rack configuration, cabled together and configured so that virtual machines can be resourced from the datacenter infrastructure, launched and used by the end user.

The architectures of FIG. 1 and FIG. 2 share storage between nodes and a storage array, in which failure on the storage array will result in loss of all the dependent appliances on that storage. FIG. 1 shows an arrangement with compute nodes accessing through a fabric integrated HA (high availability) storage systems with a dual redundant controller. FIG. 2 shows an arrangement with compute nodes accessing through a fabric an integrated HA storage system, in which each storage system accesses the disk media through a second fabric, improving failure coverage.

Resiliency and fault tolerance is provided by the storage node using dual controllers (eg. FIG. 1 C#1.1 & C#1.2). In the case of controller failure the volume resources that fail will be taken over and managed by the remaining controller.

These known architectures suffer from a number of drawbacks which can be best understood through an FMEA (Failure Mode Effects Analysis) table, below.

| FMEA Analysis Table | | |
|---|---|---|
| Failure | Critical | Remarks |
| Single controller failure within a storage node | No | Redundant 2nd controller can manage storage. FIG. 1 |
| Dual controller failure within a storage node | Yes | No controller available to manage storage, all attached appliances will fail. FIG. 1 |
| Dual controller failure within a storage node | No | Dual controller storage nodes functioning as a cluster can recover disk resource FIG. 2 Requires host and disk fabrics |
| All storage nodes fail | Yes | No available storage node to manage storage FIG. 2 requires host and disk fabrics |

US2010/0228903 (Chandrasekaran et al) discloses disk operations by a VA from a virtual machine (VM).

WO2011/049574 (Hewlett-Packard) describes a method of virtualized migration control, including conditions for blocking a VM frm accessing data.

WO2011/046813 (Veeam Software) describes a system for verifying VM data files.

US2011/0196842 (Veeam Software) describes a system for restoring a file system object from an image level backup.

The invention is directed towards providing an improved data storage system with more versatility in its architecture.

GLOSSARY

DAS, disk array storage
FMEA, Failure Mode Effects Analysis
HA, high availability
QoS, quality of service
SAV, storage area volume
SC, storage consumers
SLA, service level agreement
SP, storage providers
SPR, storage provisioning requester API
SV, storage visualizer
U-niode, universal node
VM, Virtual machine
VA, Virtual appliance
VB, virtual block devices

SUMMARY OF THE INVENTION

According to the invention, there is provided a data storage system comprising:
  at least two universal nodes each comprising:
    CPU resources,
    memory resources,
    network interface resources, and
    a storage virtualiser; and
  a system controller,
  wherein each storage virtualizer in each universal node is allocated by the system controller a number of storage provider resources that it manages,
  wherein the system controller maintains a map for dependency of virtual appliances to storage providers, and the storage virtualiser provides storage to its dependent virtual appliances either locally or through a network protocol to another universal node.

In one embodiment, said CPU, memory, network interface and storage virtualizer resources are connected between buses within each universal node, wherein at least one of said buses links said resources with virtual appliance instances, and wherein each universal node comprises a Hypervisor application for the virtual appliance instances.

In one embodiment, the storage virtualizer manages storage providers and is tolerant to fault conditions.

In one embodiment, the fault tolerance is achieved by an ability of the storage virtualiser to migrate from any one universal node to any other universal node.

In one embodiment, the storage virtualiser is attached to storage devices through a storage bus organised so that a plurality of universal nodes have the same access to a fabric and drives attached to the fabric. Preferably, a plurality of storage devices can be discovered by a plurality of universal nodes. Preferably, each storage virtualiser behaves as if it were a locally attached storage array with coupling between the storage devices and the universal node.

In one embodiment, the system controller is adapted to partition and fit the virtual appliances within each universal node.

In one embodiment, the universal nodes are configured so that in the case of a system failure each paired universal node will failover resources and workloads to each other.

In one embodiment, a Hypervisor application manages requesting and allocation of these resources within each universal node.

In one embodiment, the system further comprises a provisioning engine, and a Hypervisor application is adapted to use an API to request storage from the provisioning engine, which is in turn adapted to request a storage array to create a storage volume and export it to the Hypervisor application through the storage virtualiser.

In one embodiment, to satisfy storage requirements of virtual appliances in a universal node, each local storage array is adapted to respond to requests from a storage provisioning requester running on the universal node.

In one embodiment, the universal nodes are identical.

In one embodiment, the system controller is adapted to execute an algorithm for leadership election between peer universal nodes for failover protection. Preferably, the system controller is adapted to allow each universal node to participate in a leadership election. In one embodiment, each universal node is adapted to execute a leadership role which follows a state machine. In one embodiment, an elected leader is responsible for logically organising the universal nodes into teams with failure links. Preferably, each universal node is adapted to, if elected, create a configuration of nodes, and in the case of a node failure, the remaining configured nodes use their knowledge of pairing to recover from the failure.

In one embodiment, failover and/or failback of resources occurs between paired nodes, the leader is responsible for creating pairs, and all nodes are responsible for ensuring that their pairs are present and functioning.

In one embodiment, the system controller is adapted to dispatch workloads including virtual appliances to the universal nodes interfacing directly with the system controller or with a Hypervisor application.

In one embodiment, each storage virtualizer is attached to a set of storage provider devices by the system controller, and if any universal node fails any other universal node can be reconfigured by the system controller to take over the provider devices, recreate the virtual block resources for the recreated consumer virtua appliancess. Preferably, context, state and data can be recovered through the system controller in the event of failure of a universal node.

In one embodiment, the system controller is responsible for dispatching workloads including virtual blocks to the universal nodes interfacing directly with a Hypervisor application of the universal node.

In one embodiment, the Hypervisor application has an API which allows creation and execution of virtual appliances, and the Hypervisor application requests CPU, memory, and storage resources from the CPU, memory and storage managers, and a storage representation is implemented as if the storage were local, in which the storage virtualization virtual block is a virtualisation of a storage provider resource.

In one embodiment, the system controller is adapted to hold information about the system to allow each node to make decisions regarding optimal distribution of workloads.

In one embodiment, virtual appliances that use storage provided by the storage vcitualizer may run locally on the universal node where the storage cirtualizer has migrated to or can be run on another universal node.

In one embodiment, the system controller is responsible for partitioning and fitting of storage provider resources to each universal node, and in the case of a failure it detects the failure and migrates failed storage virtualizer virtual blocks to available universal nodes, do the system controller maintains a map and dependency list of storage virtualizer resources to every storage provider storage array.

DETAILED DESCRIPTION OF THE INVENTION

Brief Description of the Drawings

The invention will be more clearly understood from the following description of some embodiments thereof, given by way of example only with reference to the accompanying drawings in which.

DESCRIPTION OF THE EMBODIMENTS

Figure 3:
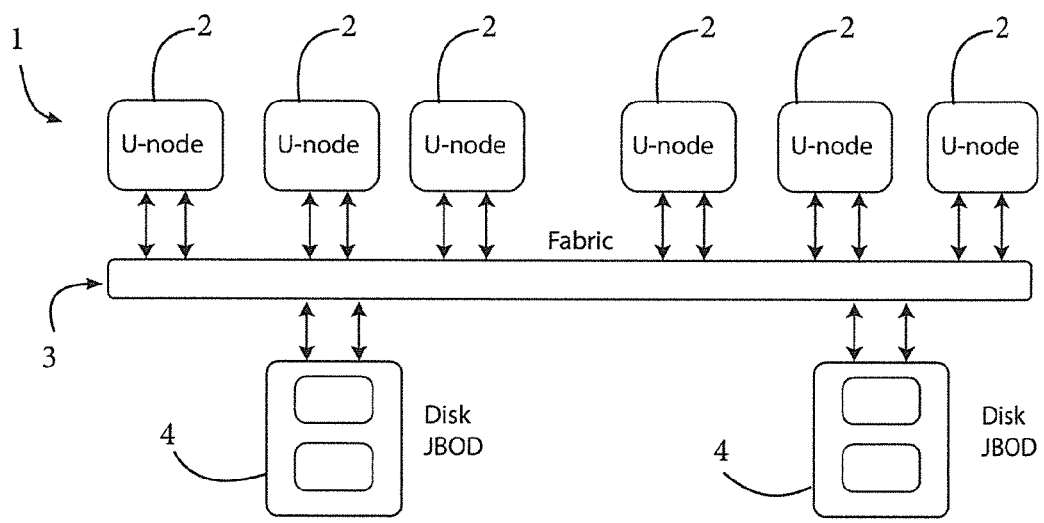
FIG. 3 shows overall architecture of a system of the invention, in which a number of universal nodes (U-nodes) are linked via a fabric with storage resources.
Figure 4:
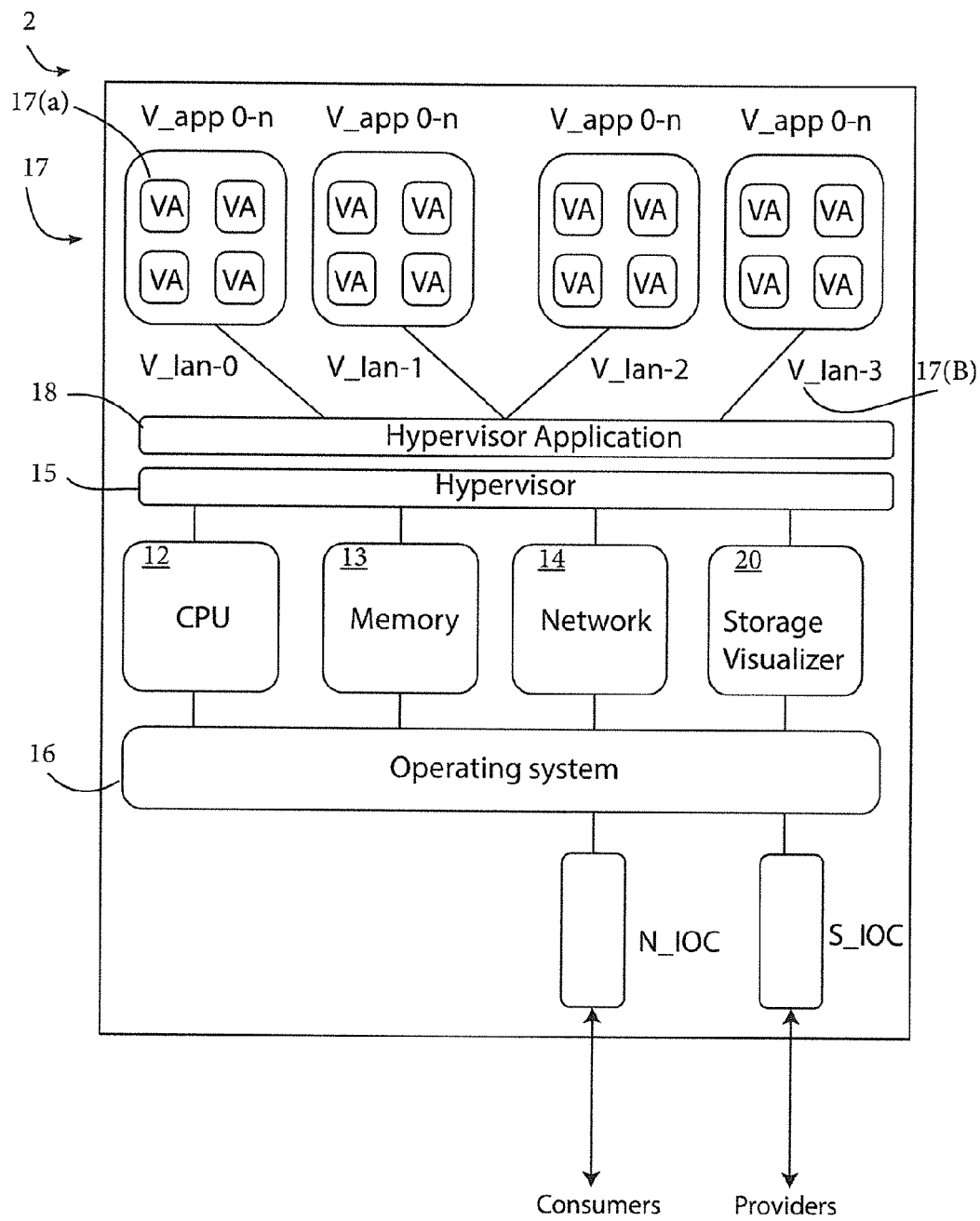
FIG. 4 shows an individual U-node broken out into its components.
Figure 5:
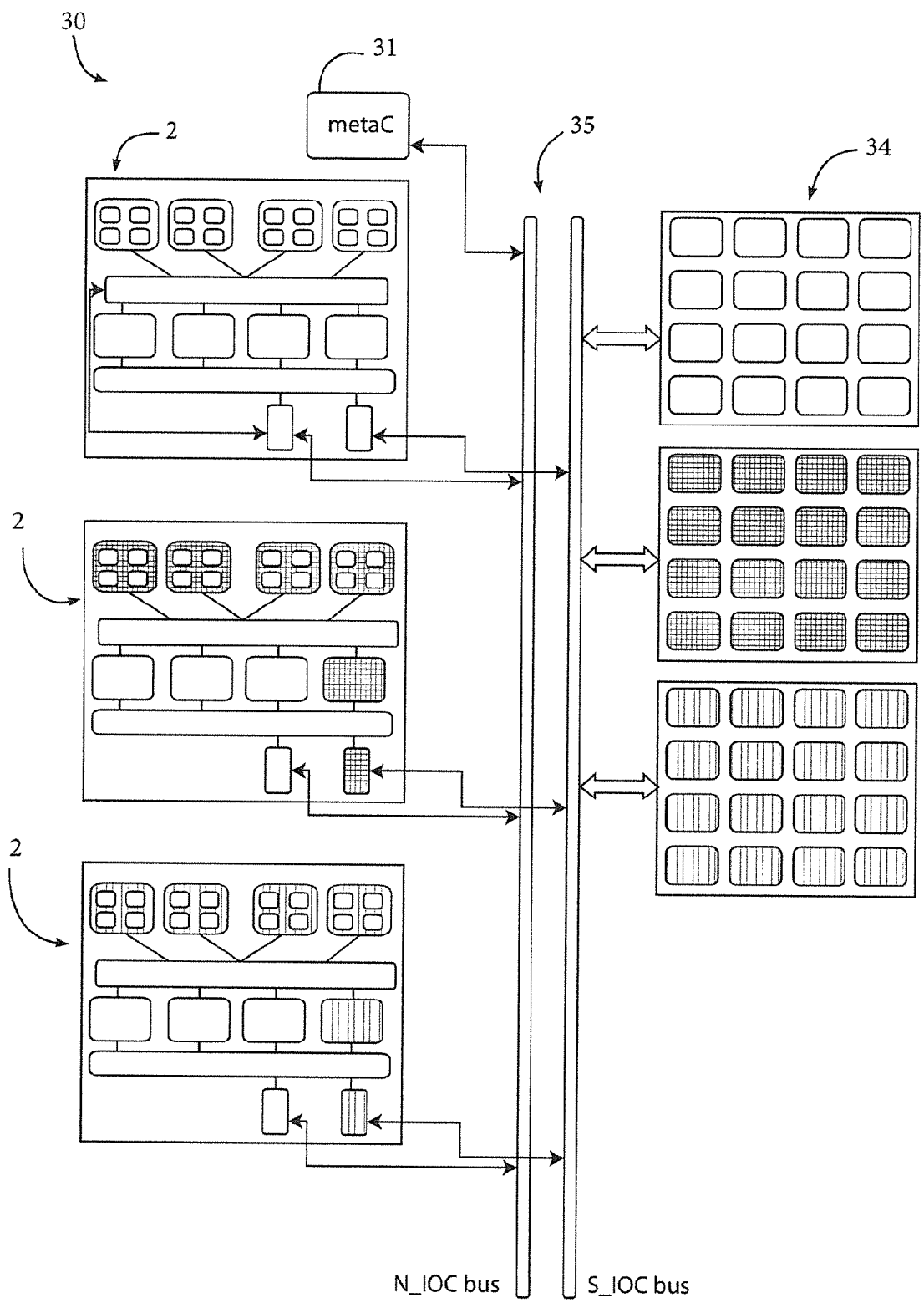
FIG. 5 shows how multiple U-nodes are arranged in a system, in one embodiment.

FIGS. 3, 4 and 5 show a system 1 of the invention with a number of U-nodes 2 linked by a fabric 3 to storage providers 4. The latter include for example JBOD drives. The U-node 2 is shown in FIG. 4, and FIG. 5 shows more detail about how it links with consumers and storage providers (via buses N_IOC and S_IOC).

Each U-node 2 has a storage virtualiser 20 along with CPU, memory, and network resources 12, 13, and 14. Each U-node also includes VAs 17, a Hypervisor application 18, a Hypervisor 15 above the resources 12-14 and 20. The N-IOC and the S_IOC interfaces 20 and 19 are linked with the operating system 16.

FIG. 4 illustrates a U-Node 1 in more detail. It is used as one of the basic building blocks to build virtual appliances from a pool of identical U-Nodes. Each U-Node provides CPU, memory, storage and network resources for each appliance. CPU managers 12, memory managers 13, and network managers 14 are coupled very tightly within the U-Node across local high speed buses to a Hypervisor layer 15 and an Operating System (OP) layer 16.

The storage resources provided by the SV layer 20 appear as if the storage was a local DAS. The U-Node allows Virtual Appliances 17(a) to run within virtual networks 17(b) in a very tightly coupled configuration of compute-storage-networking which is fault tolerant.

The U-node, via its storage virtualiser (SV), is a universal consumer of storage providers (SP) and a provider of virtual block devices (VB) to a universal set of storage consumers (SC). The storage virtualiser is implemented on each node as an inline storage layer that provides VB storage to a local storage consumer or a consumer across a fabric. Storage virtualiser 20 instances are managed by a separate controller (the "MetaC" controller) 31 which controls a number of U-nodes 2 and holds all the SV context and state. Referring again to FIG. 5 in a system 30 the U-nodes 2 are linked to an N_IOC bus as is the metaC controller 31. SPs 34 are linked with the S_IOC bus.

The storage virtualisers SV 20 are implemented as slave devices without context or state. In one embodiment the SV 20 is composed of storage consumer managers and storage provider managers, however all context and state are stored in the meta_C component 31. This allows the node 2 to fail without loss of critical metadata and the metaC controller 31 can reconstitute all the resources provided by the slave SV linstance. The SV decouples the mapping between the SPs and the SCs. By introducing the SV link the SP and the SC are now mobile.

Figure 1:
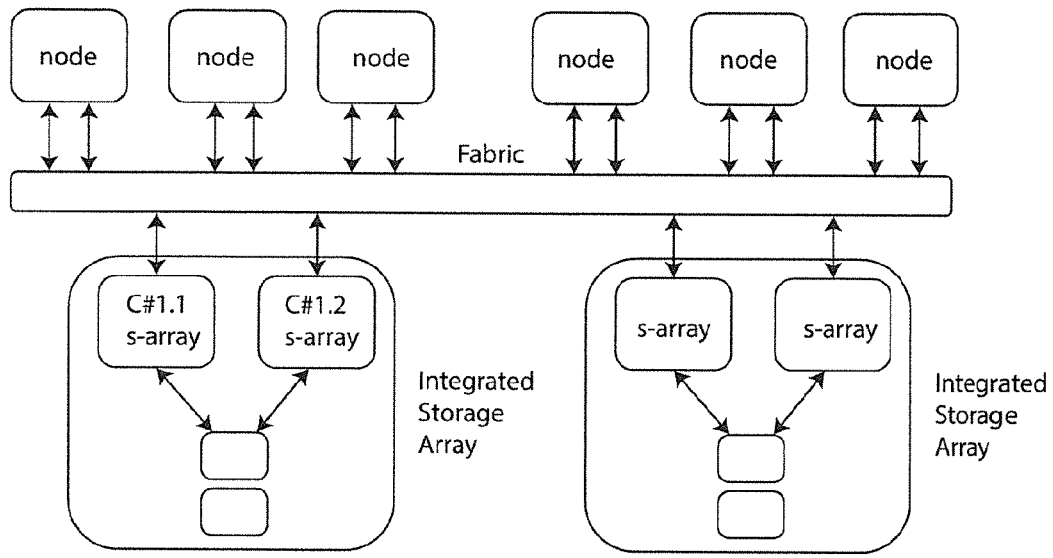
FIG. 1 shows a prior art arrangement as discussed above, with compute nodes accessing through a fabric integrated HA (High Availibility) storage systems with a dual redundant controller.

In the prior the art, for example FIG. 1, the consumer nodes above the fabric maintain mappings to storage in the SP. In the invention however, the SV 20 decouples these mappings and the U-nodes communicate with each other and the MetaC controller 31. Referring to FIG. 3 and FIG. 4 if a U-node 2 fails there is no meta data or state information in the failed node. All meta data and state is stored in the metaC controller 31; this allows the resources (VBs) managed by the failed SV to be recreated on any other U-node.

The SV 20 has functions for targets, managers, and provider management. These functions communicate via an API to the metaC controller 31. In this embodiment the metaC controller 31 maintains state and context information across all of the U-nodes of the system.

In summary, what we term the SV is a combination of the SV slave functionality on the U-node and functionality on the metaC 31. There is one metaC per multiple U-nodes.

Figure 11:
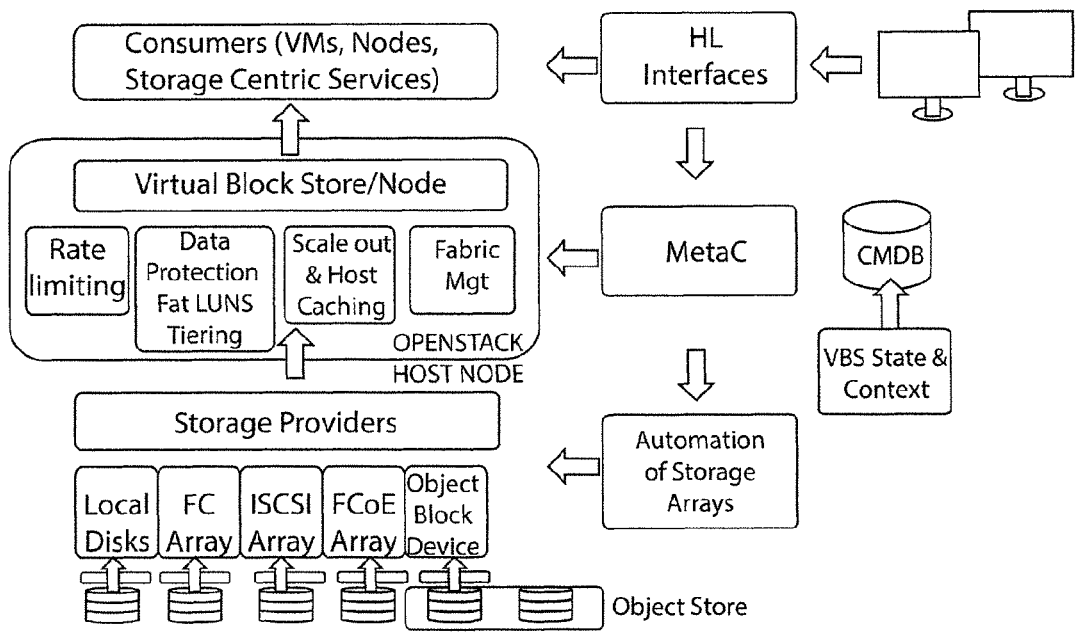
FIG. 11 is a flow diagram illustrating operation of a U-node in one embodiment.

Referring to FIGS. 5 and 11, in the system:
  The U-nodes 2 have Storage Consumers (SC) such as Virtual Appliances (VAs) or Storage Centric Services (SCS) such as object storage, Hadoop storage, Lustre storage etc
  There are links with storage providers 34 (SPs) such as disks, storage arrays and Storage Centric Services The SV 20 consumes storage from the SPs in the system and provides virtual block devices (VB) to the SCs in the system.

The (out of band) controller metaC 31 manages the creation of storage luns on the SP devices, and manages the importing of storage from the storage providers SP, and manages the creation of VB devices and exporting the VB devices to the SC.

The metaC provides a high level API (HL_API) interface to SCs.

The system manages a storage pool that can scale from simple DAS storage to multiple horizontally-scaled SANS across multiple fabrics and protocols. Unlike conventional storage systems, the system of the invention uses an SV on each node to represent resources on the SPs. The resources created by the SV are virtual block devices (VB). A virtual block device (VB) is a virtualisation of an SP resource. The SV is managed by the metaC controller 31.

By introducing a stateless storage middleware on each node the following benefits are derived.

The stateless SV having no context or state allows the node to fail with only transient impact to the system since the MetaC controller 31 can reconstitute all resources on available nodes from the MetaC context and state.
  The SV can consume any storage from any provider across any protocol and fabric; knowledge of the fabric is not required in the SV, only in the MetaC controller.
  The SV as a middleware between the storage consumer and storage provider allows a range of added value functions such as
    Data protection by mapping and replicating the VB to multiple Storage Array Volumes (SAV)
    Data scaling by striping the VB across multiple SAVs
    Redundant multipathing by mapping the VB to different instances of the SAV on alternate paths
    Node side SSD caching by introducing an SSD caching layer between the VB and the SAV
    VB rate limiting, by introducing input/output and bandwidth throttling per VB.
    System fairness by managing the node system resource allocation to the IO subsystem used for storage.
    VB virtualisation from SAV volumes, i.e many small VBs from one large SAV
    VB tiering by building a VB across multiple SAV tiers of varying QoS The U-nodes 2 provide greater flexibility than conventional storage architectures. To illustrate one such use case, consider FIG. 9, an array of SP (eg. JBOD or storage Arrays) is connected to all U-Nodes. In this configuration since no U-Node holds any specific storage context, state or physically attached storage, any U-node can fail and the resources managed by that node can be managed by any remaining node. This allows N+1 failover operation of any U-node. Each SV instance is attached to a set of provider devices by the MetaC controller, if any U-Node fails any other U-Node can be reconfigured by the MetaC controller to take over the provider devices, recreate the VB resources for the recreated consumer VAs. No loss of any U-Node leads to a system failure as all context, state and data can be recovered through the MetaC controller.

Figure 6:
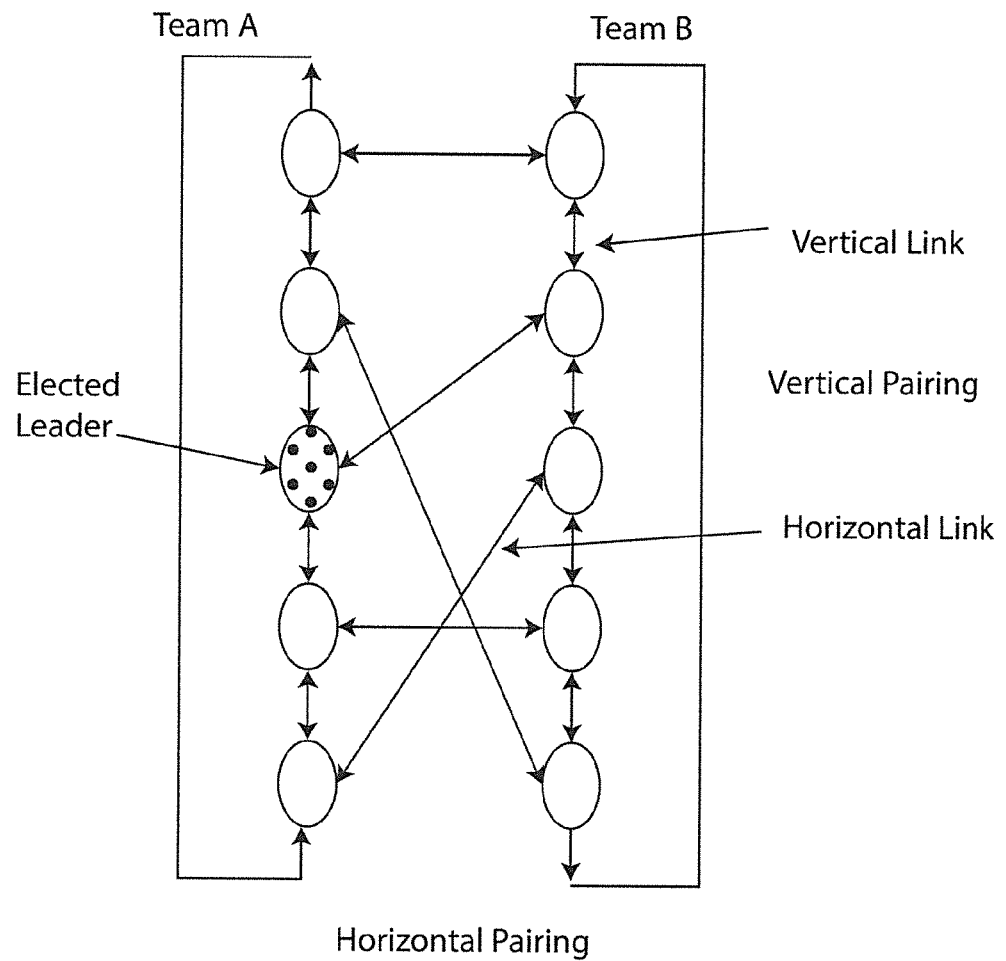
FIGS. 6 to 8 show linking of resources.
Figure 7:
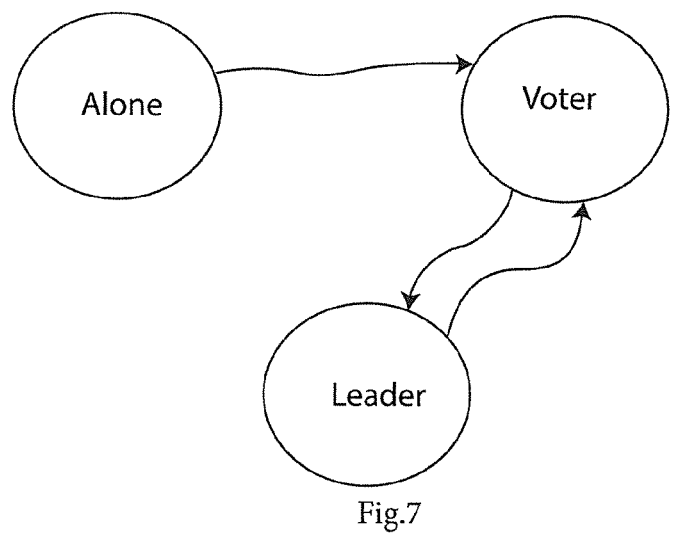
Figure 8:
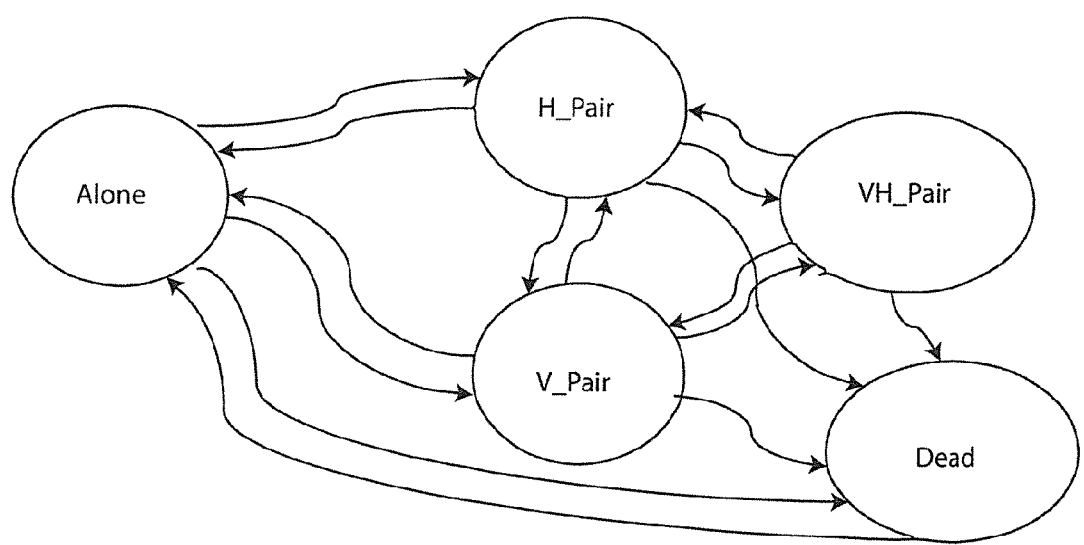

All U-Node SV instances together form a HA cluster, each U-node having a failover buddy. FIGS. 6 to 8 illustrate joining the cluster and finding a default failover "buddy". All members of the cluster are logically linked vertically and horizontally so that in the event of a node failure the cluster is aware of the failure and the appropriate failover of resources to another node can occur.

Figure 2:
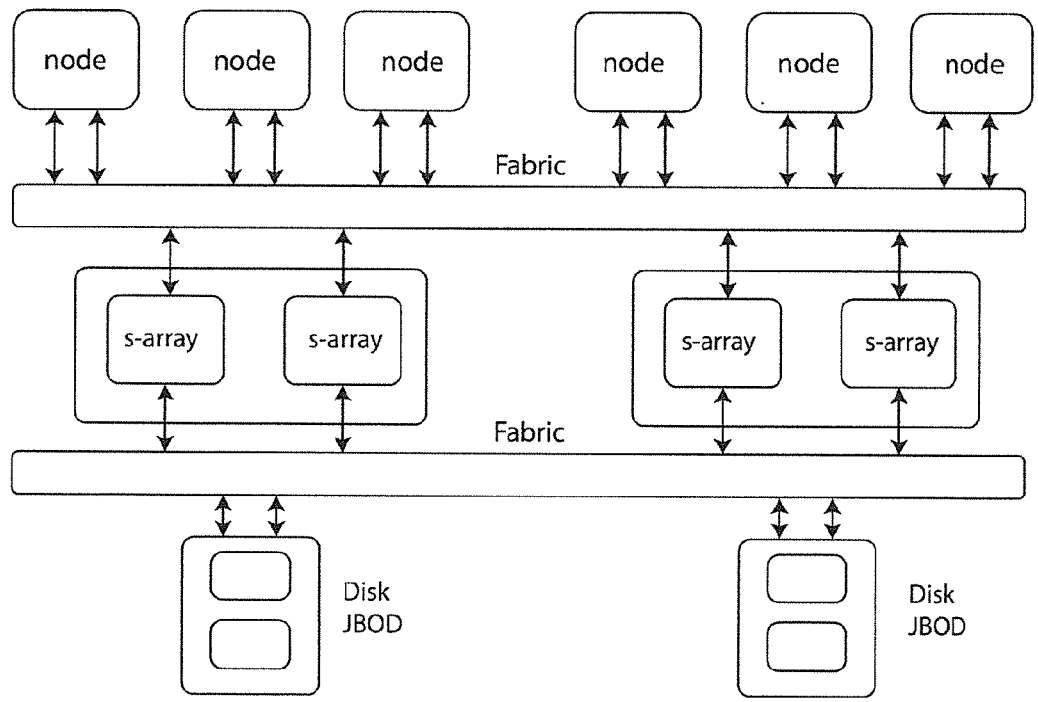
FIG. 2 shows a prior art arrangement as discussed above, with compute nodes accessing through a fabric an integrated HA storage system, in which each storage system accesses the disk media through a second fabric, improving failure coverage.

Referring again to the prior art architectures of FIGS. 1 and 2 we provide the following analysis. The cost of the FIG. 3 is lower than FIGS. 1 and 2. The cost for the system of FIG. 3 in terms of rack space required and hardware is the lowest as no dedicated storage array appliances are required. All VA nodes are identical, in the simplest implementation only JBOD storage is required. We can define the value of a Rack Value (RV) by an equation which calculates the number of software appliances that can run within a rack, as follows:

RV (RackValue)=$(V*(C*Uc)*S*(D*Ud)*Kc/(k*l))$; Uc+Ud=42, 42 is the height of an Industrial Rack in U units.

V is the number of Virtual Appliances per Core (C) in the RACK

C is the number of Cores per U of Rack Space

Uc is the number of U space allocated to Cores

D is the number of Disks per U of Rack Space

S is the average size of the disks

Ud is the number of U space allocated to Disks

Kc is the coupling constant between Virtual appliances and storage, a larger Kc implies faster coupling between storage media virtual appliance.

k is a function k=f(C/D)

l is a function l=f(C/BladeMemoryGigs)

This equation describes the value of the Rack in terms of its number of CPU Cores, spinning disks and their size, and the number of Virtual Appliances per core.

To increase the Rack Value this equation needs to be maximised. This invention increases the Rack Value for any given appliance type by:

A) increasing the coupling constant Kc

B) maximizing the amount of U space available for storage and compute nodes.

The invention described maximises Rack Value.

The "U-nodes" 2 each provide compute and storage resources to run the VAs 17. The system 1 increases the Rack Value by a U-node which integrates all resources for the VAs in 1 node. Further integration is possible with network switching but for clarity the main part of the following description is of integration of the storage and compute nodes to provide the U-node. The SV of the U-nodes 2 accesses the provider disk devices resources via a fabric 3.

The U-node 2 is a universal node where compute and storage run on the CPU core resource of the same machine. In the U-node configuration the storage management "SV" is collapsed to the same node as the compute node. A U-node is not the same as a compute node with DAS storage. A U-node SV manages provider devices that that have the same high coupling as DAS storage, however the SV is tolerant to fault conditions and is physically decoupled from the SP. The fault tolerance is achieved by the ability of the SV resource to migrate from any one U-node to any other U-node. In this way the U-node SV appears as an N+1 failover controller. Under failure conditions, failover is achieved between the N participating U-nodes by moving the resource management, the SV and the its product the VB and not by the traditional method of providing multiple failover paths from a storage array to the storage consumer.

Again referring to FIG. 5 in a storage system 30 a user of the system ("Tenant") requests a virtual appliance (VA) to be run. The MetaC component 31 is responsible for dispatching workloads (such as VBs) to the U-Nodes 2 interfacing directly with the Hypervisor application 18 of the U-node 2. The MetaC controller 31 is not the manager of the U-Node infrastructure it is simply the dispatcher of loads to the U-Nodes. FIG. 6 also shows disk resources 34 linked with the U-nodes 2 via a fabric 35.

The Hypervisor application 18 has an API which allows creation and execution of virtual machines (VM) 17 within their assigned networks. The Hypervisor application 18 requests CPU, memory, and storage resources from the CPU, memory and storage managers 12-14. The storage representation is implemented as if the storage were local, that is the SV VB is a virtualisation of a storage provider resource.

The storage provider 34 is generally understood to be disks or storage arrays attached directly or through a fabric. The SV manages all storage provider devices such as disks, storage arrays or object stores. In this way the SV is a universal consumer of storage from any storage provider and provides VB block devices to any consumer. FIG. 11 shows the how the SV and MetaC controller manage storage providers. The MetaC has a provisioning plane which can create storage array volumes (SAVs). These SAVs can be imported over a fabric/protocol to the SV. The SV virtualises the SAVs through its manager functions to virtual block devices (VBs). VBs are then exported to whatever consumer requires them. The local SV is composed of a number of slave managers which implement the tasks of importing SAVs, creating VBs and exporting to storage consumers or storage centric services. The SV does not keep context or state information. The MetaC controller keeps this information. This allows the slave SV layer to fail and no loss of information occurs in the system.

The SV 20 of each U-node 2 is attached to storage providers through an S_IOC bus 35. The S_IOC bus 35 is a fabric organised so that all U-Nodes 2 have the same access to the fabric 35 and the attached provider devices of the fabric 35. An example of an S-bus fabric 35 is where all devices can be discovered by all of the U-Nodes 2. Each SV 20 in each U-Node 2 is allocated a number of provider resources (drives or SAVs) that it manages by the MetaC controller 31. Once configured, the SV 20 behaves as if it were a locally attached storage array with high coupling (eg. SAS bus) between the disks 34 and the U-Node 2. FIG. 5 shows how multiple U-Nodes 2 provide resources to create multiple appliances on a set of U-Nodes.

It is advantageous if all nodes are logically identical and therefore the configuration of the U-nodes 2 for failover operation requires alogorithms for leadership election between peers. Each node "leadership role" follows the state machine as shown in FIGS. 7 and 8. The leader is elected by all participating nodes in the system. A leader node can fail without causing the system to fail. The elected leader is responsible for logically organising the U-nodes 2 into two teams with vertical and horizontal failure links as shown in FIG. 6. The steady state of the system is "Nodes Paired", once a leader is elected the leader's role is to create a configuration of nodes as shown in FIG. 6. In the case of a U-node failure, the remaining configured nodes use their knowledge of pairing to recover from the U-node failure. Failover and failback of resources occurs between horizontally paired nodes. The leader is responsible for creating pairs, and all nodes 2 are responsible for making sure their vertical and horizontal pairs are present and functioning. Each node's pairing state will follow the state machine as shown in FIG. 8. FIG. 6 shows a configured system after leadership election and configuration of horizontal and vertical pairing. Any node that fails will have a failover partner. Failover partners are from Team A to Team B. Should two paired nodes fail at the same time the vertical pairing will detect the failure and initiate failover procedures. Should a leader fail a leadership election process occurs as nodes will return to the Voter state.

System Failure.

Rack systems are in general very sensitive to component failures. In the case of a U-Node 2 since all components are identical any failure of a node requires that the paired controller runs the failed U-node's workload.

Figure 9:
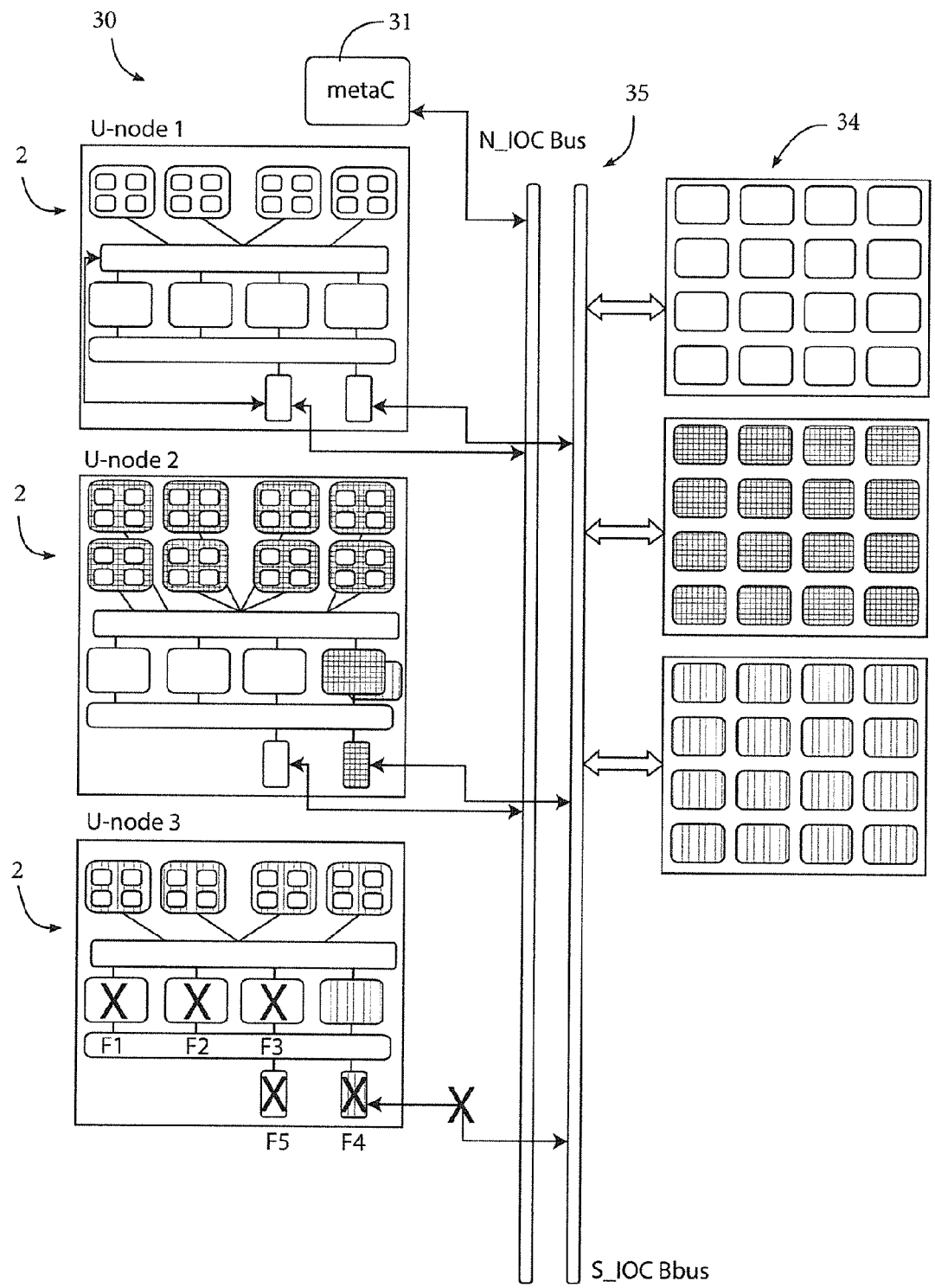
FIG. 9 shows failure recovery scenarios.

In the case of a system failure, as shown in FIG. 9 since all U-Nodes are identical any node failure will cause the workload to start on a remaining paired controller. Should a pair fail then the team is responsible for creating a new pair of controllers and distributing the workload.

The MetaC controller 31 is also shown in FIG. 9. It holds information about the system to allow each node 2 to make decisions regarding the optimal distribution of workloads.

The virtual appliances (VA) that use the storage provided by the SV 20 may run locally on the U-Node 2 where the SV 20 has migrated to or can be run on another U-Node 2. In the case of a VA 17 running on a remote U-Node the storage resource is provided to the SV as a network volume over the fabric protocol (such as iSCSI over TCP/IP).

System Recovery.

In the event of a U-Node 2 recovering from a system failure it will negotiate with its pair to fallback its workload.

FIG. 6 also illustrates this mechanism in which:

U-node 2 and U-node 3 are horizontally paired, and
U-node 1 and U-node 2 are vertically paired.

Failure F1.

In this failure mode the CPU no longer functions and the node 2 is detected as DEAD The node H_Paired device will recover the workload.

Failure F2.

In this failure mode the memory no longers functions and the node is detected as DEAD The node H_Paired device will recover the workload.

Failure F3/F4.

In these failure modes the network no longers functions and the node is detected as alive but not communicating (example a network cable/switch has failed). In this mode the node may be killed (DEAD) depending on the severity of the failure.

The node H_Paired device will recover the workload.

Failure F5.

In this failure mode the access to the disk bus no longers functions and the node 2 is detected as alive but storage is not available. In this mode the node will failover its s-Array function (SV 20) to its H_paired device which will recover the storage function and export the storage devices to the U-node through the N-IOC bus.

Failure F6 (U-Node2 and U-Node4 Failure).

In this Failure mode the vertical V-Pair device will detect and node failure and instantiate a recovery process. Should no H_Paired device exist the V_Paired device will recover the workload.

U-Node v/s Compute with DAS

A compute node with DAS storage is similar to a U-Node except the storage node and compute node are bound together and if one fails the other also fails. In the U-node configuration if the U-node fails the virtual appliances 7 can re-start on an alternative node as discussed in the failure modes above.

The U-Node architecture allows one to increase the value RV (Rack Value) by moving the storage array software from a dedicated storage appliance into the same node. This node (U-Node) provides compute, network and storage resources to each VLAN within the node.

The increase in Rack Value comes from

A) Less wasted space on storage appliances
B) Higher coupling speed between compute and storage Controller 31 Operation.

The metaC software control entity 31 is responsible for the partitioning and fitting of SP resources to each U-Node. In the case of a failure it detects the U-Node failure and migrates failed SV VBs to available U_nodes. The metaC maintains a map and dependency list of SV resources to every SP storage array. The SV provides storage either to its dependent appliances locally through the HyperVisor 15 or if the Virtual Appliance 17 cannot be run locally storage is provided using a network protocol on the N-TOC (network TOC bus).

To satisfy the resource requirements of the Virtual Appliances (VA) in each VLAN, local CPU, memory and networking resources are consumed from the available CPU, memory, and networking resources. The Hypervisor application 18 manages the requesting and allocation of these resources. The Hypervisor application 18 uses an API (Storage Provisioning Requester API (SPR)) to request storage from the MetaC provisioning engine, the MetaC creates volumes on the SP disks 34 and exports the storage over a number of conventional protocols (an iSCSI, CIFS or NFS share) to the SV 20. The SV 20 than exports the storage resource to the VA through the Hypervisor 15 or as an operating system 16 block device to a storage centric service. A VA may also use the SPR API directly for self provisioning.

In the case of a failure mode occurring a paired node will recover the workload of the failed device. In the case of a failed pair of nodes the metaC controller 31 will distribute the workloads over the remaining nodes. U-nodes are identical in the sense that they rank equally between each other and if required run the same workloads. However U-nodes can be built using hardware systems of different capabilities (i.e #CPU cores, #Gigabytes of memory, S_IOC/N_IOC adaptors). This difference in hardware capabilities means that pairing is not arbitrary but pairs are created according to a pairing policy. Pairing policies may be best-with-best or best-with-worst or random etc. In a best-with-best pairing policy U-Nodes can then in the nominal case be ranked with highest to lowest SLA (Service Level Agreement, eg Gold, Silver, Bronze). In a best-with-worst pairing policy the average pair SLA of all pairs are approximately equivalent. The MetaC controller manages workload dispatching according to policies setup in the MetaC controller.

Figure 10:
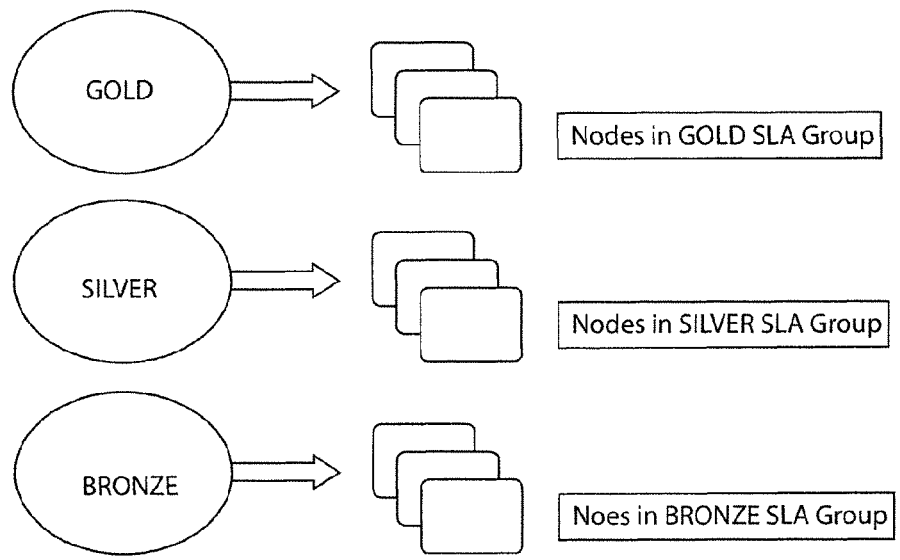
FIG. 10 shows how policies are used to dispatch workloads to paired U-nodes.

FIG. 10 shows how the policies are used to dispatch workloads to the paired U-nodes. In this example U-Nodes are associated by capability into various SLA groups. Depending on the workload, required SLA and resource availibility on the existing U-Nodes the MetaC controller 31 will dispatch the workload to the appropriate U-node. For any workload the MetaC controller 31 is responsible for understanding the existing workloads, the U-node failure coverage & resiliency, the required SLA and dispatching new workloads to the most appropriate U-Node. For example the workload SLA may require High Availibility and therefore only functioning paired nodes are candidates to run the workload.

The invention is not limited to the embodiments described, but may be varied in construction and detail.

The invention claimed is:

1. A data storage system comprising:
   at least two universal nodes each comprising:
      CPU resources,
      memory resources, network interface resources, and
a storage virtualizer;
storage providers; and
a system controller,
wherein the storage virtualizer is attached to said storage providers through a storage bus organized so that a plurality of universal nodes have the same access to a fabric and storage providers attached to the fabric, wherein:
each storage virtualizer in each universal node is allocated by the system controller a number of storage provider resources that it manages, the system controller being configured to maintain a map for dependency of storage consumers to storage provider resources, and storing context and state of each storage virtualizer such that each storage virtualizer is a slave device,
each storage virtualizer is configured to provide storage to dependent storage consumers, said storage being through a network protocol to said storage providers,
each storage virtualizer is configured to manage storage providers and is tolerant to fault conditions and the fault tolerance is achieved by an ability of the storage virtualizer to migrate to any other universal node, in which if any universal node fails any other universal node can be reconfigured by the system controller to take over the storage providers by recovering storage virtualizer context and state held by the system controller;
the storage consumers include virtual appliances which are configured to run locally on a universal node where the storage virtualizer has migrated to or can be run on another universal node, and
wherein the system controller is configured to execute an algorithm for each universal node to participate in a leadership election between a pair universal nodes for failover protection;
wherein each universal node is configured to execute a leadership role, if elected, in which each universal node:
is responsible for logically organizing the universal nodes into teams with vertical and horizontal failure links,
creates a configuration of nodes in pairs, in which in the case of a node failure the remaining nodes use their knowledge of pairing to recover from the failure;
wherein failover and/or failback of resources occurs between horizontally paired nodes and all nodes are responsible for ensuring that their vertical and horizontal paired nodes are present and functioning and should no horizontally paired node exist a vertically paired node will recover to workload.

2. The storage system as claimed in claim 1, wherein said CPU, memory, network interface and storage virtualizer resources are connected between buses within each universal node, wherein at least one of said buses links said resources with virtual appliance instances, and wherein each universal node comprises a Hypervisor application for the virtual appliance instances.

3. The storage system as claimed in claim 1, wherein a plurality of storage devices are configured to be discovered by a plurality of universal nodes, and wherein each storage virtualizer is configured to behave as if it were a locally attached storage array with coupling between the storage devices and the universal node.

4. The storage system as claimed in claim 1, wherein the system controller is configured to partition and fit the virtual appliances within each universal node.

5. The storage system as claimed in claim 1, wherein a Hypervisor application manages requesting and allocation of these resources within each universal node.

6. The storage system as claimed in claim 1, wherein said CPU, memory, network interface and storage virtualizer resources are connected between buses within each universal node, wherein at least one of said buses links said resources with virtual appliance instances, and wherein each universal node comprises a Hypervisor application for the virtual appliance instances; and wherein the system further comprises a provisioning engine, and a Hypervisor application is configured to use an API to request storage from the provisioning engine, which is in turn configured to request a storage array as a virtualization of a storage provider resource to create a storage volume and export it to the Hypervisor application through the storage virtualizer.

7. The storage system as claimed in claim 1, wherein said CPU, memory, network interface and storage virtualizer resources are connected between buses within each universal node, wherein at least one of said buses links said resources with virtual appliance instances, and wherein each universal node comprises a Hypervisor application for the virtual appliance instances; and wherein the system further comprises a provisioning engine, and a Hypervisor application is configured to use an API to request storage from the provisioning engine, which is in turn configured to request a storage array to create a storage volume and export it to the Hypervisor application through the storage virtualizer; and wherein, to satisfy storage requirements of virtual appliances in a universal node, each local storage array is configured to respond to requests from a storage provisioning requester running on the universal node.

8. The storage system as claimed in claim 1, wherein the universal nodes are identical.

9. The storage system as claimed in claim 1, wherein the system controller is configured to dispatch workloads including virtual appliances to the universal nodes interfacing directly with the system controller or with a Hypervisor application.

10. The storage system as claimed in claim 1, wherein said CPU, memory, network interface and storage virtualizer resources are connected between buses within each universal node, wherein at least one of said buses links said resources with virtual appliance instances, and wherein each universal node comprises a Hypervisor application for the virtual appliance instances; and wherein the system controller is responsible for dispatching workloads including storage provider virtual blocks to the universal nodes interfacing directly with a Hypervisor application of the universal node.

11. The storage system as claimed in claim 1, wherein said CPU, memory, network interface and storage virtualizer resources are connected between buses within each universal node, wherein at least one of said buses links said resources with virtual appliance instances, and wherein each universal node comprises a Hypervisor application for the virtual appliance instances; and wherein the Hypervisor application has an API which allows creation and execution of virtual appliances, and the Hypervisor application requests CPU, memory, and storage resources from the CPU, memory and storage managers, and a storage representation is implemented as if the storage were local, in which the storage virtualization virtual block is a virtualization of a storage provider resource.

12. The storage system as claimed in claim 1, wherein the system controller is configured to hold information about the system to allow each node to make decisions regarding optimal distribution of workloads.

13. The storage system as claimed in claim 1, wherein the system controller is configured to be responsible for partitioning and fitting of storage provider resources to each universal node, and is configured to, in the case of a failure, detect the failure and migrate failed storage virtualizer virtual blocks to available universal nodes, and the system controller is configured to maintain a map and dependency list of storage virtualizer resources to every storage provider storage array.

14. The storage system as claimed in claim 1, wherein each universal node is configured to execute a leadership role which follows a state machine, in which there are voter and leader states, and to return to a voter state if a leader fails.

* * * * *